(12) United States Patent
DuBois et al.

(10) Patent No.: US 12,317,000 B1
(45) Date of Patent: *May 27, 2025

(54) PUBLISHER-SUBSCRIBER ARCHITECTURE FOR VIDEO CONFERENCING

(71) Applicant: Amazon Technologies, Inc., Seattle, WA (US)

(72) Inventors: Sean Patrick DuBois, Columbus, OH (US); Christopher LaFata, Moraga, CA (US); James Hurley, San Francisco, CA (US); Raymond Kung Hsien Lin, Milpitas, CA (US); Alex Converse, Oakland, CA (US); Adam Lupinacci, Novato, CA (US); Maxwell Stoller, Astoria, NY (US); James Yamat, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,938

(22) Filed: Dec. 20, 2023

Related U.S. Application Data

(63) Continuation of application No. 17/936,175, filed on Sep. 28, 2022, now Pat. No. 11,910,131.

(51) Int. Cl.
  *H04N 7/15* (2006.01)
  *H04N 7/14* (2006.01)

(52) U.S. Cl.
  CPC .............. *H04N 7/15* (2013.01); *H04N 7/147* (2013.01)

(58) Field of Classification Search
  CPC ....... H04N 7/15; H04N 7/147; H04L 12/1831
  USPC ......................................................... 709/204
  See application file for complete search history.

(56) References Cited

U.S. PATENT DOCUMENTS

| | | | | |
|---|---|---|---|---|
| 10,230,679 | B1* | 3/2019 | Kielhofner | H04L 65/1053 |
| 10,542,237 | B2* | 1/2020 | Gottlieb | H04W 4/08 |
| 11,290,330 | B1* | 3/2022 | Kothuri | H04L 41/082 |
| 11,755,758 | B1* | 8/2023 | Southwood | G06V 30/413 |
| | | | | 382/170 |
| 2010/0057851 | A1* | 3/2010 | Ionescu | H04L 65/1104 |
| | | | | 709/204 |
| 2012/0147127 | A1* | 6/2012 | Satterlee | H04N 7/152 |
| | | | | 348/E7.078 |
| 2014/0149570 | A1* | 5/2014 | Berger | H04L 67/141 |
| | | | | 709/224 |
| 2014/0267571 | A1* | 9/2014 | Periyannan | H04L 12/1827 |
| | | | | 348/14.08 |
| 2014/0313278 | A1* | 10/2014 | Periyannan | H04N 7/152 |
| | | | | 348/14.08 |

(Continued)

*Primary Examiner* — Tauqir Hussain
(74) *Attorney, Agent, or Firm* — Athorus, PLLC

(57) ABSTRACT

Described are systems and methods for providing a publisher-subscriber architecture for audio and/or video conferencing. Embodiments of the present disclosure can utilize one edge computing resources associated with each client device participating in the audio and/or video conference. One or more client devices can publish streams to the associated edge computing resources. The streams can then be pushed via a data network to the edge computing resources associated with the subscribing client devices. The subscribing client devices can access and fetch the streams from the edge computing resources, which can be presented on the client devices as part of a conferencing session experience.

20 Claims, 9 Drawing Sheets

(56) References Cited

U.S. PATENT DOCUMENTS

| | | | |
|---|---|---|---|
| 2014/0313282 A1* | 10/2014 | Ma | H04N 7/141 |
| | | | 348/14.09 |
| 2015/0350704 A1* | 12/2015 | Horen | G06F 16/40 |
| | | | 725/95 |
| 2016/0165184 A1* | 6/2016 | Aaron | H04L 12/1822 |
| | | | 348/14.08 |
| 2016/0295252 A1* | 10/2016 | Karnik | H04N 21/64322 |
| 2017/0177442 A1* | 6/2017 | Han | G06F 11/1415 |
| 2018/0191832 A1* | 7/2018 | Gero | H04L 65/4015 |
| 2019/0320014 A1* | 10/2019 | Allen | H04N 21/222 |
| 2020/0389506 A1* | 12/2020 | Rakshit | H04L 65/1083 |
| 2021/0084425 A1* | 3/2021 | Mehta | H04L 65/403 |
| 2022/0006756 A1* | 1/2022 | Ramaswamy | H04L 45/64 |
| 2022/0141090 A1* | 5/2022 | Kothuri | H04L 43/20 |
| | | | 709/220 |
| 2022/0329883 A1* | 10/2022 | Stokking | H04N 21/2353 |
| 2023/0188543 A1* | 6/2023 | Petersson | H04L 63/1416 |
| | | | 348/14.08 |

* cited by examiner

PUBLISHER-SUBSCRIBER ARCHITECTURE FOR VIDEO CONFERENCING

CROSS-REFERENCE TO PRIOR APPLICATIONS

This application is a continuation of and claims benefit to U.S. application Ser. No. 17/936,175, filed on Sep. 28, 2022, entitled "PUBLISHER-SUBSCRIBER ARCHITECTURE FOR VIDEO CONFERENCING," the disclosure of which is hereby incorporated by reference in its entirety.

BACKGROUND

Video conferencing can conveniently allow many participants located in different locations around the world to connect during a video conferencing session. Although many video conferencing platforms and architectures are available, existing video conferencing platforms typically employ a single, centralized server to which all the participants must connect, or peer-to-peer connections. For example, video conferencing architectures, such as a multipoint control unit (MCU) architecture and a selective forwarding unit (SFU) architecture, traditionally rely on a single server configured to obtain and process the video streams from each of the participants, as well as send the video stream(s) to each participant, and other architectures, such as WebRTC, may rely on peer-to-peer connections. The performance (e.g., latency, jitter, etc.) of single server implementations employed by such conventional architectures can degrade as the number of participants and/or the geographical area over which the participants are located grows. Further, the various streams that are processed by the single server are typically not individually addressable, and creating rules, permissions, etc. for each participant in a video conferencing session can be difficult. Additionally, peer-to-peer systems, such as WebRTC, can suffer from degraded video quality and/or are difficult to scale.

DETAILED DESCRIPTION

Figure 1:
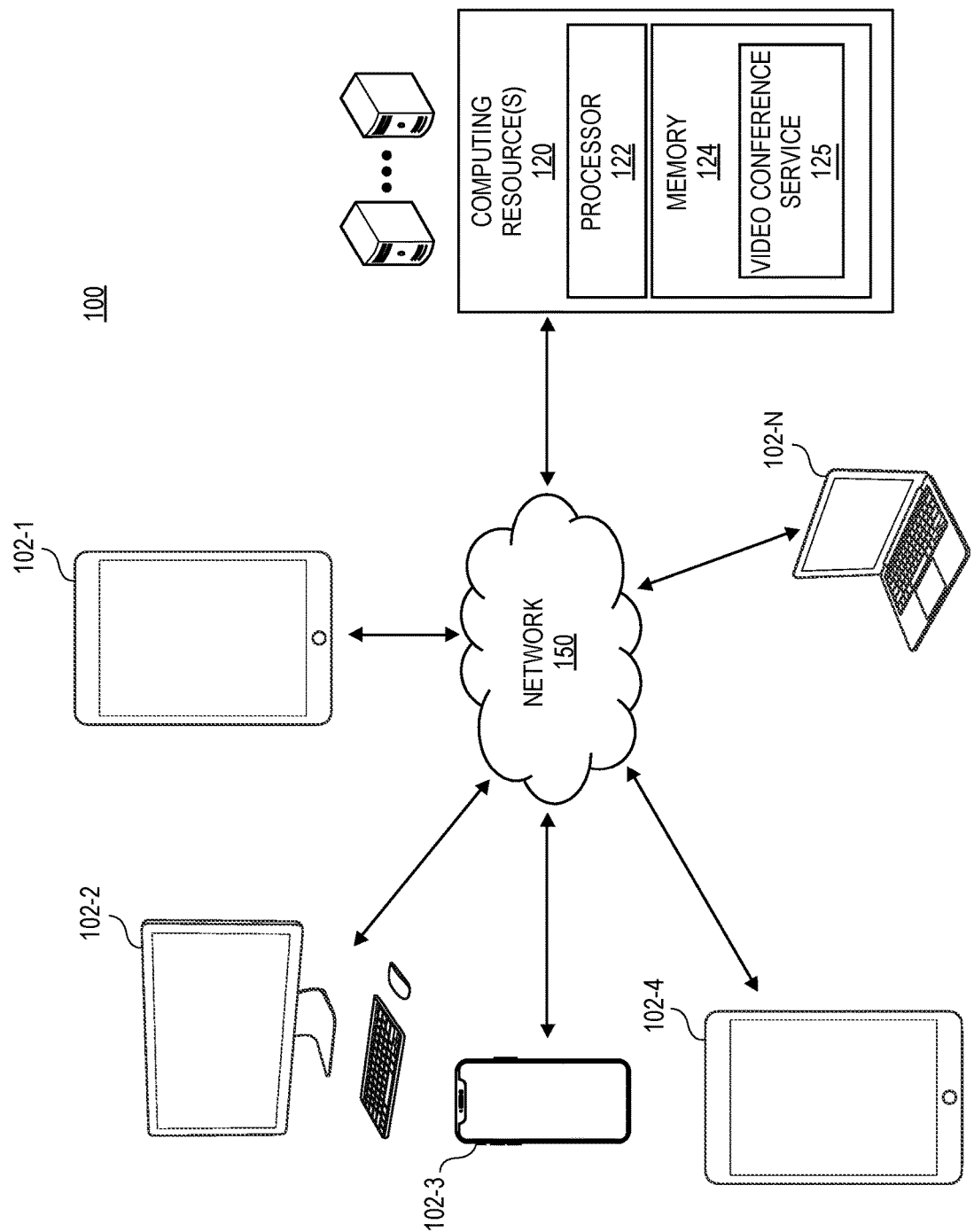
FIG. 1 is an illustration of an exemplary computing environment, according to exemplary embodiments of the present disclosure.

As is set forth in greater detail below, exemplary embodiments of the present disclosure are generally directed to systems and methods for providing a publisher-subscriber architecture for audio and/or video conferencing. According to exemplary embodiments of the present disclosure, for each participant of an audio and/or video conferencing session, a corresponding edge node and/or server may be determined and associated with the client device that the participant may be using. The edge node and/or server determined for each participant may be utilized to publish streams captured by the corresponding client device used by the participant, as well as subscribe to streams published by other client devices participating in the audio and/or video conferencing session. Accordingly, the streams published by participants may be captured by their respective client devices (e.g., using a microphone, camera, and the like), and the streams may be published to their corresponding edge nodes and/or servers. Further, one or more of the client devices participating in the audio and/or video conferencing session may subscribe to one or more published streams. Based on the published streams to which the various client devices are subscribed, the published streams may be pushed and/or transmitted via a low-latency data network, such as a private content delivery network (CDN), from the corresponding edge nodes and/or servers at which the streams are published to the edge nodes and/or servers associated with the client devices subscribing to the various published streams. The streams may be accessed and fetched by client devices from the corresponding edge nodes and/or servers and presented on the client devices as part of the audio and/or video conferencing session experience.

According to exemplary embodiments of the present disclosure, each stream published (and subscribed to) by the client devices are individually addressable. The individual addressability of the published streams facilitates various features that are typically unavailable to conferencing systems employing a traditional single, centralized server architecture. For example, each participant can opt to publish, or not publish, a stream in connection with the video conferencing session. Accordingly, a participant electing not to publish a stream may participate in the video conferencing session as an audience member, observer, etc. Additionally, each participant participating in the video conferencing session may select (or not select) to subscribe to one or more of the published streams, before or during the video conferencing session. For example, a participant may choose to subscribe to all the published streams associated with a conferencing session. Alternatively and/or in addition, a participant may choose not to subscribe to one or more streams of participant(s) of the conferencing session who may not be relevant to the user of the conferencing session. Further, subscriptions to the streams may be dynamically changed during the video conferencing session. Similarly, a video conferencing session may be recreated utilizing a subset of published streams in the video conferencing session.

In an exemplary implementation of the present disclosure, the published streams can also be aggregated prior to being pushed and/or transmitted from the publishing edge node and/or server to the subscribing edge node and/or server. For example, once each client device has been associated with a corresponding edge node and/or server and the stream subscriptions have been determined (e.g., which client devices are subscribing to which published streams), it can be determined if any of the published streams may be aggregated before being pushed and/or transmitted to the appropriate edge nodes and/or servers. For example, it can be determined if more than one client device is associated with a common edge node and/or server. For each edge node and/or server that is associated with more than one client device, it may be determined whether at least two of the client devices associated with the common edge node and/or server are subscribed to a common stream. In the event that it is determined that at least two of the client devices associated with the common edge node and/or server are subscribed to a common stream, the subscribed stream may be aggregated prior to being pushed and/or transmitted to the common edge node and/or server so that the stream is not pushed and/or transmitted multiple times to the common edge node and/or server.

Advantageously, the publisher-subscriber architecture employed by exemplary implementations of the present disclosure may be compatible with existing protocols, such as Real-time Transport Protocol (RTP), WebRTC, HTTP Live Stream (HLS), and the like, to provide a low-latency and low jitter streaming, broadcasting, conferencing architecture that can be scaled to accommodate any number of clients. Advantageously, exemplary embodiments of the present disclosure can provide an architecture for conferencing using individually addressable streams from each client device. This can provide increased flexibility compared to existing conferencing technologies, as each stream from each client device can be individually manipulated, published, subscribed to, and the like. Additionally, the exemplary embodiments of the present disclosure can provide a low-latency, low jitter conferencing architecture that can be scaled to accommodate nearly any number of client devices.

Further, although exemplary embodiments of the present disclosure are primarily described in connection with video streams that are used in connection with a video conferencing service, the exemplary embodiments of the present disclosure are applicable to other implementations in connection with other data streams, such as audio conferencing, broadcasting media, gaming live streaming, video on demand, and the like, which may benefit from a low-latency publisher-scriber architecture that can facilitate individually addressable data streams from each publisher and/or subscriber. Accordingly, as used herein, stream and/or data stream can refer to various forms of encoded content (e.g., live, recorded, etc.), media, audio, video, any combination thereof, and the like, or any other data.

FIG. 1 is an illustration of an exemplary computing environment 100, according to exemplary embodiments of the present disclosure.

As shown in FIG. 1, computing environment 100 may include one or more client devices 102 (e.g., client device 102-1, 102-2, 102-3, 102-4, through 102-N), also referred to as user devices, for connecting over network 150 to access computing resources 120, which may be configured to provide online applications, services, computing platforms, servers, and the like, such as video conference service 125 (which may be configured to execute on remote computing resources 120). Client devices 102 may include any type of computing device, such as a smartphone, tablet, laptop computer, desktop computer, wearable, etc., and network 150 may include any wired or wireless network (e.g., the Internet, cellular, satellite, Bluetooth, Wi-Fi, etc.) that can facilitate communications between client devices 102 and computing resources 120.

According to exemplary implementations of the present disclosure, computing resources 120 may be representative of computing resources that may form a portion of a larger networked computing platform (e.g., a cloud computing platform, and the like), which may be accessed by client devices 102. Computing resources 120 may provide various services and/or resources and do not require end-user knowledge of the physical premises and configuration of the system that delivers the services. For example, computing resources 120 may include "on-demand computing platforms," "software as a service (Saas)," "infrastructure as a service (IaaS)," "platform as a service (PaaS)," "platform computing," "network-accessible platforms," "data centers," "virtual computing platforms," and so forth. As shown in FIG. 1, computing resources 120 may include processor(s) 122 and memory 124, and may be configured to execute and/or provide video conference service 125, according to exemplary embodiments of the present disclosure. Example components of a remote computing resource which may be used to implement computing resources 120 is discussed below with respect to FIG. 6.

As illustrated in FIG. 1, one or more of client devices 102 may access computing resources 120, via network 150, to access and/or execute video conference service 125 to initiate, conduct, participate in, etc. a video conference session. According to other exemplary embodiments of the present disclosure, computing resources 120 may provide other live streaming and/or broadcasting services, such as an audio-conferencing service, a media broadcasting service, a live streaming gaming service, a video on demand service, and the like. In the exemplary implementation illustrated in FIG. 1, an application may be launched and/or accessed on client devices 102 to access and/or interact with video conference service 125 through network 150. According to aspects of the present disclosure, a user may, via the application launched and/or executed on client devices 102, initiate, terminate, conduct, etc. a video conferencing session with one or more users associated with client devices 102.

According to an exemplary implementation of the present disclosure, each client device 102 participating in the video conferencing session may first be issued a token, which may be used to authenticate each respective client device 102 with video conference service 125. After authentication, an edge node and/or server may be determined for each client device 125 to which the client device may publish a stream and/or subscribe to one or more streams associated with other client devices 102. For example, the determined edge node and/or server may be an edge node and/or server that is located geographically closest to the particular client device. Alternatively and/or in addition, the current state of each edge node and/or server within a certain geographic area surrounding each respective client device may be determined and the edge node and/or server able to provide the relatively fastest performance may be selected as the edge node and/or server for each respective client device.

After the edge node and/or server has been determined, one or more of client devices 102 participating in the video conferencing session may publish a stream (e.g., video media stream, audio stream, etc.) to each corresponding edge node and/or server, which can be stored in the cache of each corresponding edge node and/or server. The published stream may include, for example, video and/or audio captured by each respective client device 102. In addition to publishing a stream, one or more of client devices 102 may subscribe to one or more streams published by client devices 102. Since the streams captured by client devices 102 are separately published, each stream may be individually addressable. Accordingly, in an exemplary implementation where all client devices 102 may be participating in a video conferencing session, not all client devices 102 are required to publish a stream and/or to subscribe to all the published streams. For example, in an exemplary implementation where client devices 102-1, 102-2, 102-3, 102-4, and 102-N are participating in a video conferencing session, only client devices 102-1, 102-2, and 102-3 may elect to publish a respective stream. Accordingly, client devices 102-4 and 102-N may subscribe to the streams published by client devices 102-1, 102-2, and 102-3, while not publishing their own streams such that they effectively act as "audience" members to the video conferencing session (e.g., listening and/or observing the streams published by client devices 102-1, 102-2, and 102-3 but not presenting their own streams for publication). From the perspective of client devices 102-4 and 102-N, this can essentially be viewed as a broadcast of the streams published by client devices 102-1, 102-2, and 102-3.

Similarly, each of client devices 102 can also elect to subscribe to some of the published streams. Continuing the example implementation where only client devices 102-1, 102-2, and 102-3 are publishing a stream, each of client devices 102 may subscribe to one or more of the streams published by client devices 102-1, 102-2, and 102-3. For example, client device 102-1 may only subscribe to the stream published by client device 102-2. Alternatively and/or in addition, client device 102-2 may subscribe to the streams published by client devices 102-1 and 102-3, and client device 102-3 may subscribe to the streams published by client devices 102-1 and 102-2. Accordingly, an exemplary video conferencing session conducted between client devices 102-1, 102-2, 102-3, 102-4, and 102-N may include any number of streams and any number of subscriptions by each client device 102.

Based on the streams to which each client device 102 is subscribing, the published streams may pushed over a data network (e.g., content delivery network (CDN), etc.) from the edge node and/or server at which each respective stream is published to the edge nodes and/or servers associated with the subscribing client devices 102, which can result in relatively low latency (e.g., <200 ms, <300 ms, etc.) associated with sending the streams from the publishers to the subscriber. Additionally, this can facilitate reducing the jitter associated with the transmission of the streams, thereby facilitating reduction in the size of a buffer that is required in connection with the streams.

Continuing the example implementation where streams are being published by client devices 102-1, 102-2, and 102-3, client devices 102-4 and 102-N are subscribing to the streams published by client devices 102-1, 102-2, and 102-3, client device 102-1 is subscribing to the stream published by client device 102-2, client device 102-2 is subscribing to the streams published by client devices 102-1 and 102-3, and client device 102-3 is subscribing to the streams published by client devices 102-1 and 102-2, the stream published by client device 102-1 may be pushed from the edge node and/or server associated with client device 102-1 to the edge nodes and/or servers associated with client devices 102-2, 102-3, 102-4, and 102-N, the stream published by client device 102-2 may be pushed from the edge node and/or server associated with client device 102-2 to the edge nodes and/or servers associated with client devices 102-1, 102-3, 102-4, and 102-N, and the stream published by client device 102-3 may be pushed from the edge node and/or server associated with client device 102-3 to the edge nodes and/or servers associated with client devices 102-1, 102-2, 102-4, and 102-N. Accordingly, the various streams may be accessed and/or fetched by each respective client device 102 at the corresponding edge node and/or server (e.g., from the cache) for presentation and/or consumption by each respective client device 102.

According to an exemplary implementation of the present disclosure, the published streams can also be aggregated prior to being pushed and/or transmitted from the publishing edge node and/or server to the subscribing edge node and/or server. Continuing the example implementation, if it is determined that client devices 102-4 and 102-N are associated with the same edge node and/or server, the streams published by client devices 102-1, 102-2, and 102-3 may be aggregated prior to being pushed and/or transmitted to the edge node and/or server associated with client devices 102-4 and 102-N so that the published streams are not sent multiple times from the publishing edge nodes and/or server to the edge node and/or server associated with client devices 102-4 and 102-N.

The application executing on client devices 102 can compile and present the various streams in a graphical user interface presented on each client device 102 into a video conferencing session experience. The graphical user interface of video conference service 125 may also provide various features and functions to users of video conference service 125 to initiate, conduct, terminate, etc. a video conferencing session between users of client devices 102. As exemplary implementations of the present disclosure can facilitate individually addressing each stream (e.g., associated with each client device 102, etc.) of a video conferencing session, video conference service 125 may facilitate features, such as selection of one or more streams associated with participants of a video conferencing session, initiation and/or termination with respect to one or more streams associated with participants of a video conferencing session while not terminating the entire video conferencing session, and the like.

Figure 2:
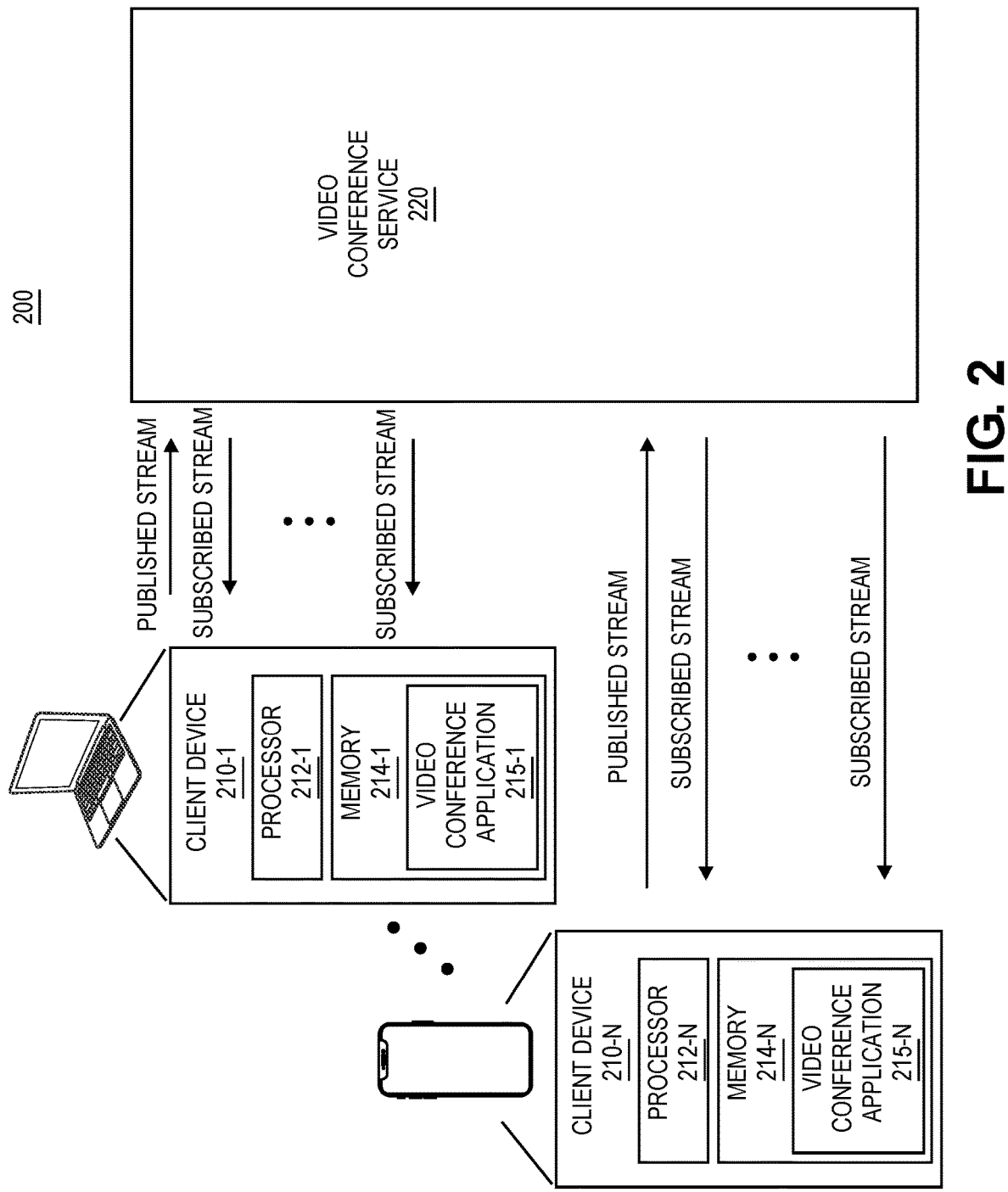
FIG. 2 is an illustration of an exemplary computing environment, according to exemplary embodiments of the present disclosure.

FIG. 2 is an illustration of an exemplary computing environment 200, according to exemplary embodiments of the present disclosure.

As shown in FIG. 2, computing environment 200 can include client devices 210-1 through 210-N accessing video conference service 220 in connection with conducting a video conference session, according to exemplary embodiments of the present disclosure. As shown in FIG. 2, each client device 210 may include respective processor 212 (e.g., processor 212-1 through 212-N) and respective memory 214 (e.g., memory 214-1 through 214-N). Further, each client device 210 may be configured to execute and run video conference application 215 (e.g., video conference application 215-1 through 215-N). Accordingly, each client device 210 may access and execute respective video conference application 215 to initiate and conduct a video conference session. Upon a request to initiate a video conference session, an edge node and/or server that may be used to publish and/or subscribe to the various streams of the video conference session may be identified for each client device 210. This may include, for example, the edge node and/or server that is geographically closest to each respective client device. Further, each edge node and/or server may be specified by a location identifier.

As the video conference is conducted, each client device 210 may capture a data stream using, for example, a camera, microphone, etc. of client device 210, and publish the captured data stream to its respective edge node and/or server. The data stream may then be transmitted and/or pushed (e.g., via a data network, CDN, etc.) to edge nodes and/or servers associated with client devices 210 subscribing to the data stream. The subscribing client devices 210 can then access and/or fetch the data stream from each respective edge node and/or server. One or more of the subscribed data streams may then be presented on a graphical user interface on client devices 210 to deliver a video conferencing experience to users of client devices 210.

Further, as shown in FIG. 2, each respective stream published (and subscribed to) is individually addressable. The individual addressability of the each of the data streams can facilitate certain functionality that cannot be provided by traditional methods of video conferencing. For example, one or more of client devices 210 can opt to subscribe to less than all the streams available for the video conference. Accordingly, each user can customize his/her video conference experience to include only a subset of the participants of the video conference, before or during the video conference session. Additionally, users can also opt to not publish a data stream and only subscribe to the desired data streams so that he/she participates as an observer/audience member. In an exemplary implementation where only one particular client device of client devices 210 publishes a data stream and the remaining client devices 210 only subscribe to the published data stream (e.g., without publishing their own data streams), the publishing of and subscription to the single stream effectively becomes a broadcast of the data stream published by the particular client device.

FIGS. 3A-3D are illustrations of an exemplary computing environment 300, according to exemplary embodiments of the present disclosure.

As shown in FIGS. 3A-3D, computing environment 300 may include one or more client devices 302 (e.g., client device 302-1, 302-2, 302-3, through 302-N), also referred to as user devices, for connecting over network 350 to access computing resources 320, which may include processor 322 and memory 324, and may be configured to provide online applications, services, computing platforms, servers, and the like, such as video conference service 325 (which may be configured to execute on computing resources 320). Client devices 302 may include any type of computing device, such as a smartphone, tablet, laptop computer, desktop computer, wearable, etc., and network 350 may include any wired or wireless network (e.g., the Internet, cellular, satellite, Bluetooth, Wi-Fi, etc.) that can facilitate communications between client devices 302 and computing resources 320.

As illustrated in FIGS. 3A-3D, one or more of client devices 302 may access computing resources 320, via network 350, to initiate, participate in, or otherwise conduct a video conference session. According to other exemplary embodiments of the present disclosure, computing resources 320 may provide other live streaming and/or broadcasting services, such as an audio-conferencing service, a media broadcasting service, a live streaming gaming service, a video on demand service, and the like.

In conducting a video conference session, an edge node and/or server may be determined for each client device 302 to which the client device may publish a stream and/or subscribe to one or more streams published by other client devices. For example, the determined edge node and/or server may be an edge node and/or server that is located geographically closest to the particular client device. Alternatively and/or in addition, the current state of each edge node and/or server within a certain geographic area surrounding each respective client device may be determined, and the edge node and/or server able to provide the relatively fastest performance may be selected as the edge node and/or server for each respective client device. According to certain exemplary embodiments, the control plane may determine the edge nodes and/or servers for each client device 302.

Figure 3A:
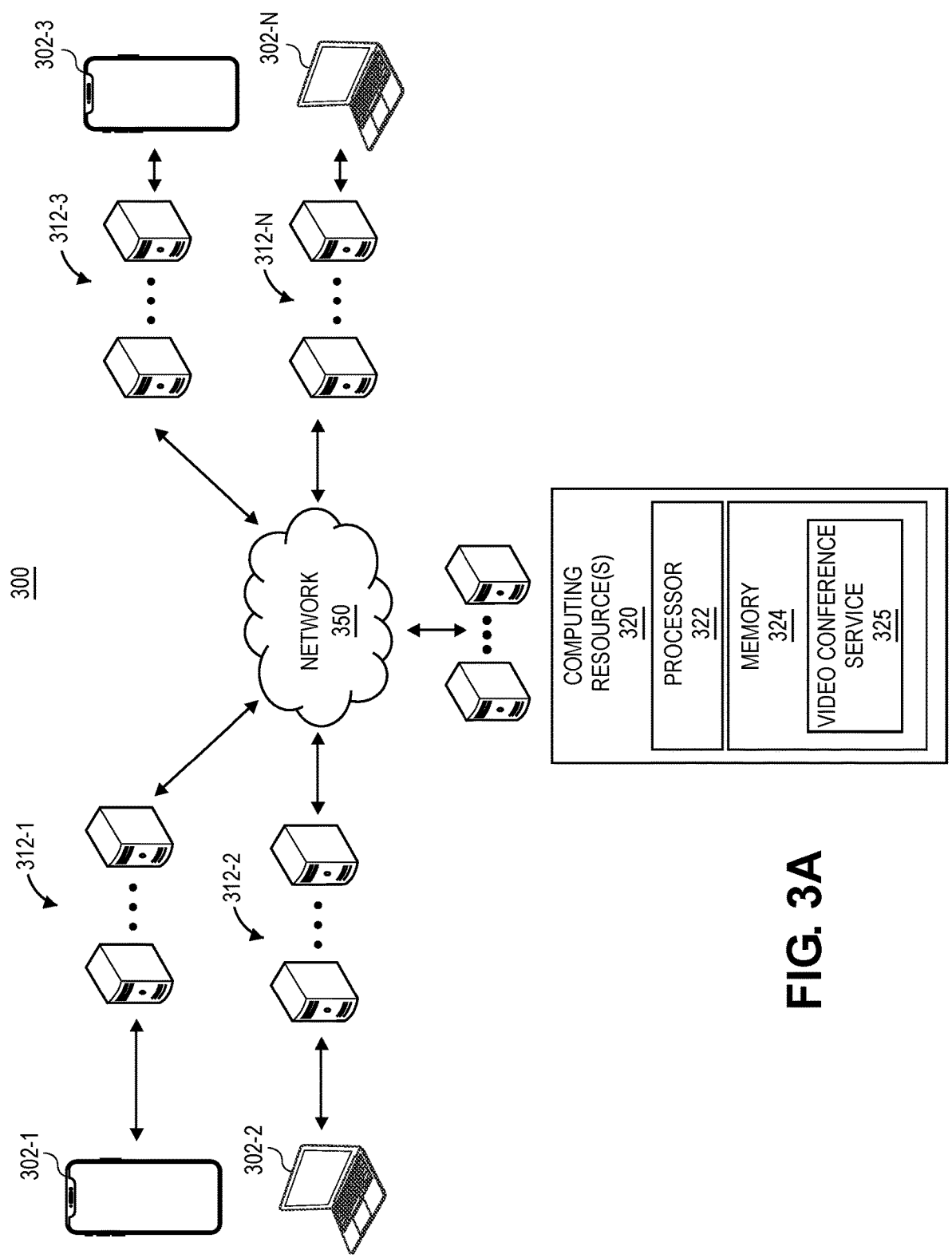
FIGS. 3A-3D are illustrations of an exemplary computing environment, according to exemplary embodiments of the present disclosure.
Figure 3B:
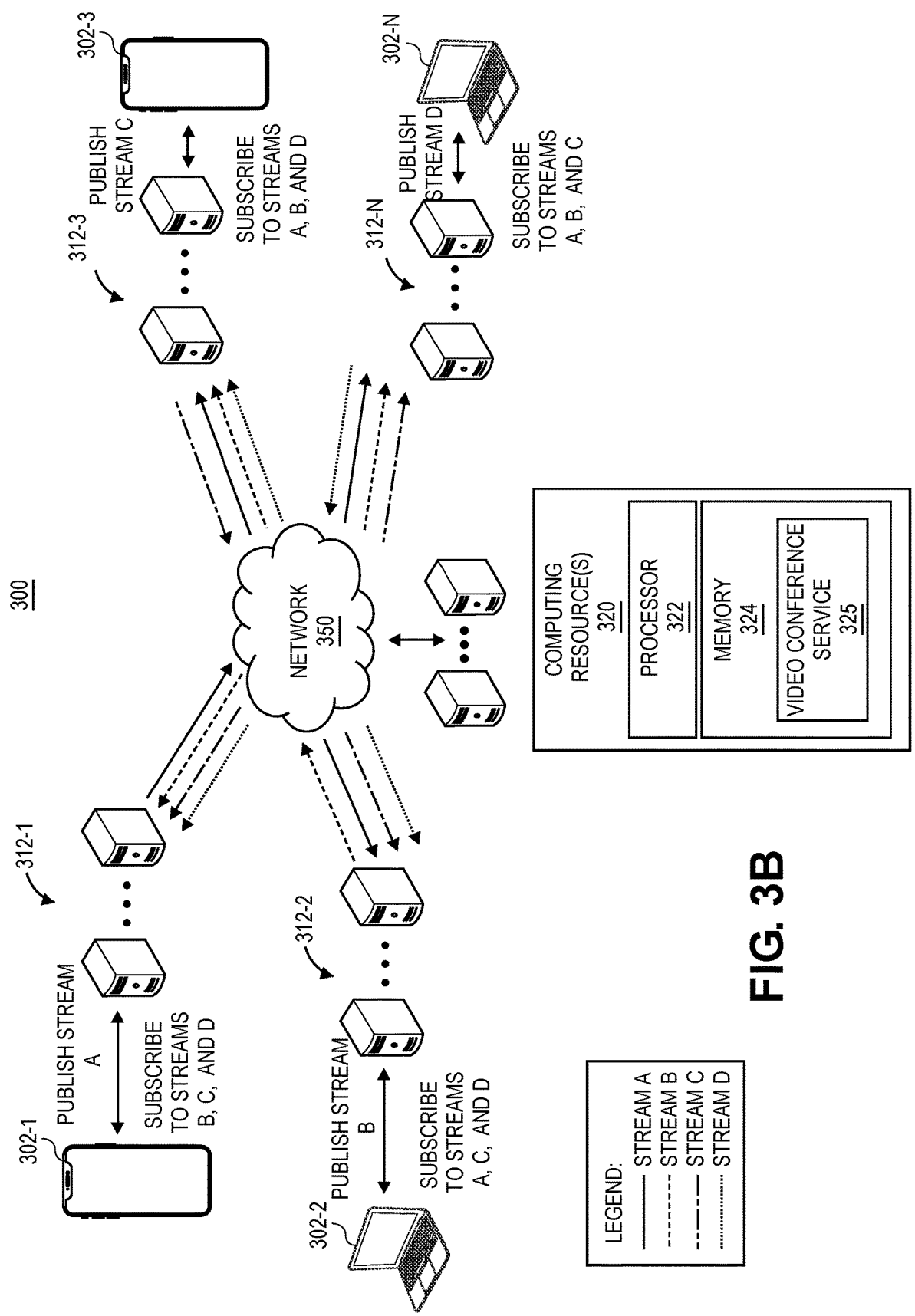
Figure 3C:
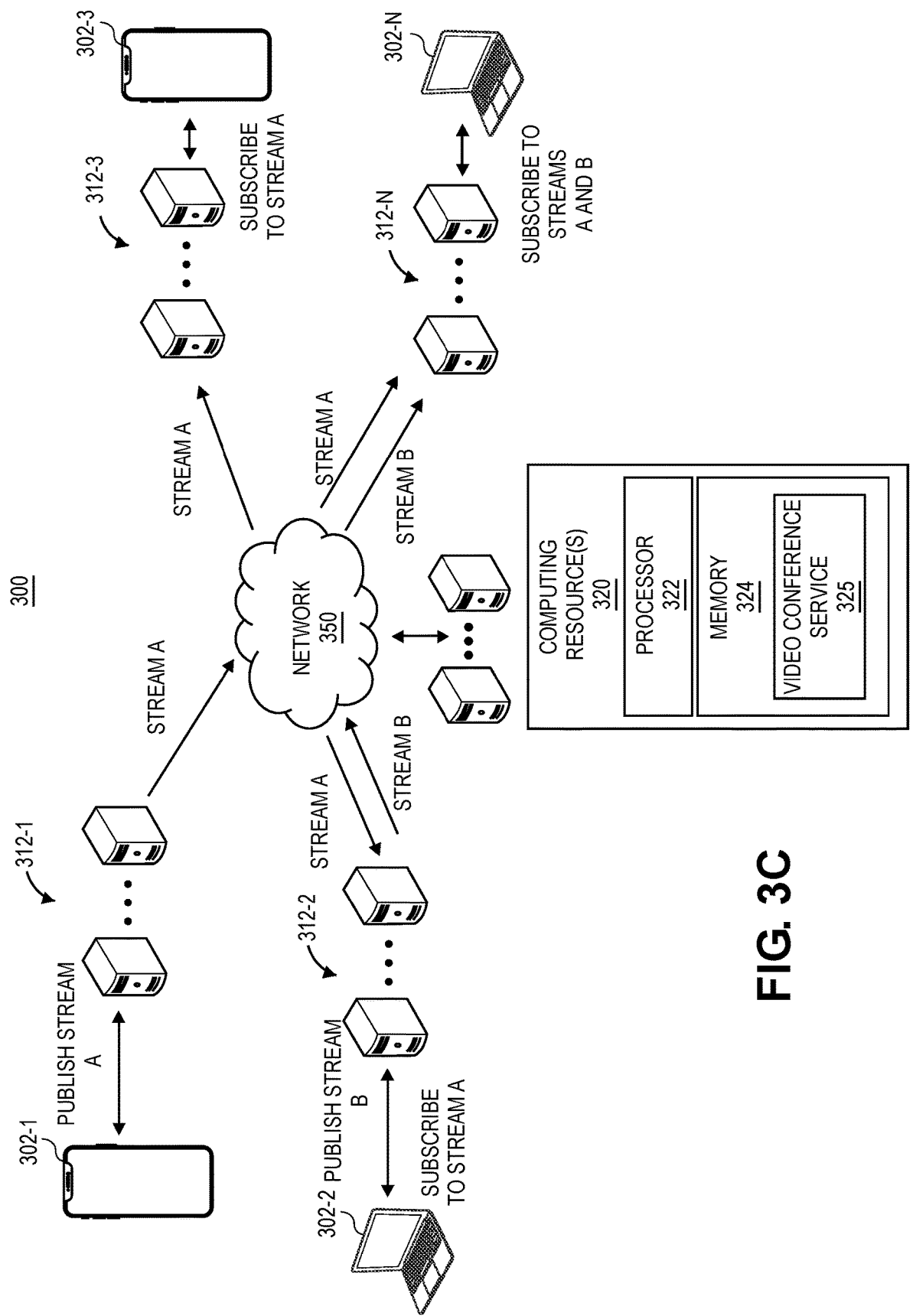

As shown in FIGS. 3A-3C, an edge computing resource, such as edge node and/or server 312-1, may be the determined edge node and/or server that is associated with client device 302-1, edge node and/or server 312-2 may be the determined edge node and/or server that is associated with client device 302-2, edge node and/or server 312-3 may be the determined edge node and/or server that is associated with client device 302-3, and edge node and/or server 312-N may be the determined edge node and/or server that is associated with client device 302-N. Accordingly, during a video conference session, client device 302-1 may publish a data stream to edge node and/or server 312-1 (e.g., to the cache, etc.), client device 302-2 may publish a data stream to edge node and/or server 312-2, client device 302-3 may publish a data stream to edge node and/or server 312-3, and client device 302-N may publish a data stream to edge node and/or server 312-N. In the exemplary implementation shown in FIG. 3D, edge node and/or server 312-1 may be the determined edge node and/or server that is associated with client device 302-1, edge node and/or server 312-2 may be the determined edge node and/or server that is associated with client device 302-2, and edge node and/or server 312-N may be the determined edge node and/or server that is associated with both client device 302-3 and 302-N. Further, according to exemplary implementations, for each conference session, the control plane may maintain a directory including the location (e.g., location identifiers indicating the location of each edge node and/or server where each stream is published, etc.) of where each stream is published. Example components of a remote computing resource which may be used to implement edge nodes and/or servers 312 is discussed below with respect to FIG. 6.

In the exemplary implementation illustrated in FIGS. 3A-3D, the data streams published by client devices 302-1, 302-2, 302-3, and/or 302-N to edge nodes and/or servers 312-1, 312-2, 312-3, and/or 312-N, respectively, may be transmitted and/or pushed to one or more of the edge nodes and/or servers associated with the subscribing client devices for each data stream. Specifically, the published data streams may be transmitted and/or pushed to one or more of edge nodes and/or servers 312-1, 312-2, 312-3, and/or 312-N based on which client devices 302-1, 302-2, 302-3, and/or 302-N are subscribing to which data streams. Accordingly, the subscribing client devices 302 can fetch and/or access the published data streams to which they are subscribed from a respective one of edge nodes and/or servers 312-1, 312-2, 312-3, and/or 312-N. The fetched and/or accessed data streams may then be presented on the corresponding client devices 302 as part of a video conferencing experience.

FIG. 3B illustrates an exemplary implementation of a video conference session conducted on computing environment 300, according to exemplary embodiments of the present disclosure.

As shown in FIG. 3B, client devices 302-1, 302-2, 302-3, and/or 302-N may be participating in a video conference session conducted by video conference service 325.

To initiate a video conference session between client devices 302-1, 302-2, 302-3, and/or 302-N, video conference service 325 may obtain a request to initiate a video conference session between client devices 302-1, 302-2, 302-3, and/or 302-N. For each of client devices 302-1, 302-2, 302-3, and/or 302-N, an associated edge node and/or server may be determined. This may include, for example, the edge node and/or server that is geographically closest to each of client devices 302-1, 302-2, 302-3, and/or 302-N. In the exemplary implementation illustrated in FIG. 3B, edge node and/or server 312-1 may be the edge node and/or server that was determined to be associated with client device 302-1, edge node and/or server 312-2 may be the edge node and/or server that was determined to be associated with client device 302-2, edge node and/or server 312-3 may be the edge node and/or server that was determined to be associated with client device 302-3, and edge node and/or server 312-N may be the edge node and/or server that was determined to be associated with client device 302-N. According to certain exemplary embodiments, the control plane may determine the edge nodes and/or servers for each client device 302.

Next, the publication and subscription status of each of client devices 302-1, 302-2, 302-3, and/or 302-N may be determined. For example, it may be determined which of client devices 302-1, 302-2, 302-3, and/or 302-N may be publishing a data stream, and which of client devices 302-1, 302-2, 302-3, and/or 302-N may be subscribing to one or more data streams published by one or more of client devices 302-1, 302-2, 302-3, and/or 302-N. In the exemplary implementation illustrated in FIG. 3B, each of client devices 302-1, 302-2, 302-3, and 302-N is publishing a data stream. Specifically, client device 302-1 is publishing STREAM A to edge node and/or server 312-1, client device 302-2 is publishing STREAM B to edge node and/or server 312-2, client device 302-3 is publishing STREAM C to edge node and/or server 312-3, and client device 302-N is publishing STREAM D to edge node and/or server 312-N. Each of STREAM A, STREAM B, STREAM C, and STREAM D may include a video stream captured by, for example, a microphone, camera/imaging device, etc. implemented on client devices 302-1, 302-2, 302-3, and 302-N, respectively. According to exemplary implementations, for each conference session, the control plane may maintain a directory including the location (e.g., location identifiers indicating the location of each edge node and/or server where each stream is published, etc.) of where each stream is published.

Further, as illustrated in FIG. 3B, each of client devices 302-1, 302-2, 302-3, and 302-N may be subscribed to all of the streams published by the other client devices. For example, client device 302-1 may be subscribed to STREAMS B, C, and D, published by client devices 302-2, 302-3, and 302-N, respectively, client device 302-2 may be subscribed to STREAMS A, C, and D, published by client devices 302-1, 302-3, and 302-N, respectively, client device 302-3 may be subscribed to STREAMS A, B, and D, published by client devices 302-1, 302-2, and 302-N, respectively, and client device 302-N may be subscribed to STREAMS A, B, and C, published by client devices 302-1, 302-2, and 302-3, respectively. Accordingly, based on the subscriptions to the various streams by client devices 302-1, 302-2, 302-3, and 302-N, the appropriate streams may be transmitted and/or pushed, via a data network (e.g., a CDN, etc.), to the appropriate corresponding edge nodes and/or servers. As illustrated, in view of client device 302-1's subscription to STREAMS B, C, and D, STREAMS B, C, and D, published by client devices 302-2, 302-3, and 302-N, respectively, may be pushed and/or transmitted to edge node and/or server 312-1. Client device 302-1 may then access and/or fetch STREAMS B, C, and D from edge node and/or server 312-1, which may then be presented on client device 302-1 as part of a video conference experience. Similarly, in view of client device 302-2's subscription to STREAMS A, C, and D, STREAMS A, C, and D, published by client devices 302-1, 302-3, and 302-N, respectively, may be pushed and/or transmitted to edge node and/or server 312-2. Client device 302-2 may then access and/or fetch STREAMS A, C, and D from edge node and/or server 312-2, which may then be presented on client device 302-2 as part of a video conference experience. Additionally, in view of client device 302-3's subscription to STREAMS A, B, and D, STREAMS A, B, and D, published by client devices 302-1, 302-2, and 302-N, respectively, may be pushed and/or transmitted to edge node and/or server 312-3. Client device 302-3 may then access and/or fetch STREAMS A, B, and D from edge node and/or server 312-3, which may be presented on client device 302-3 as a video conference experience. Finally, in view of client device 302-N's subscription to STREAMS A, B, and C, STREAMS A, B, and C, published by client devices 302-1, 302-2, and 302-3, respectively, may be pushed and/or transmitted to edge node and/or server 312-N. Client device 302-N may then access and/or fetch STREAMS A, B, and C from edge node and/or server 312-N, which may then be presented on client device 302-N as part of a video conference experience. Additionally, the directory maintained by the control plane may also include locations (e.g., location identifiers indicating the location of each subscribing edge node and/or server, etc.) of the location where each stream is published.

Further, as exemplary implementations of the present disclosure can facilitate individually addressing each stream (e.g., STREAMS A, B, C, and D associated with each client device 302, etc.) of a video conferencing session, video conference service 325 may facilitate features, such as selection of one or more streams associated with participants of a video conferencing session, initiation and/or termination with respect to one or more streams associated with participants of a video conferencing, and the like. For example, one or more of client devices 302 may subscribe to any number of STREAMS A, B, C, and/or D, published by client devices 302-1, 302-2, 302-3, and/or 302-N, respectively, before or during the video conferencing session. Accordingly, any of client devices 302 may terminate its subscription to one or more of STREAMS A, B, C, and/or D during the video conferencing session (e.g., via an instruction, command, indication, etc. sent to video conference service 325, etc.), without terminating their participation in the video conferencing session in its entirety. In such an exemplary implementation where client device 302-1 were to terminate its subscription to STREAM B (published by client device 302-2), STREAM B may no longer be transmitted and/or pushed to edge node and/or server 312-1, and STREAM B may no longer be available to and/or presented on client device 302-1 as part of the video conference session experience. However, client device 302-1 may continue to subscribe to STREAMS A, C, and D, allowing STREAMS A, C, and D to be presented on client device 302-1 as part of the video conferencing session experience.

Similarly, one or more of client devices 302 may also terminate publishing a stream (e.g., via an instruction, command, indication, etc. sent to video conference service 325, etc.) at any time during or before the video conference session. For example, client device 302-3 may terminate publication of STREAM C (e.g., via an instruction, command, indication, etc. sent to video conference service 325, etc.) during the video conference session. In such an exemplary implementation, STREAM C would no longer be published on edge node and/or server 312-3, and would therefore be no longer pushed and or transmitted to edge nodes and/or servers 312-1, 312-2, and 312-N, and would no longer be available to client devices 302-1, 302-2, and/or 302-N. However, the video conferencing session may continue with STREAMS A, B, and D continuing to be published by client devices 302-1, 302-2, 302-N to edge nodes and/or servers 312-1, 312-2, and 312-N, respectively, and transmitted and/or pushed to edge nodes and/or servers 312-1, 312-2, 312-3, and 312-N, which can continue to be accessed and fetched by client devices 302-1, 302-2, 302-3, and 302-N. Accordingly, the termination of publishing a stream and/or subscription to a stream may be updated in the directory maintained by the control plane.

FIG. 3C illustrates yet another exemplary implementation of a video conference session conducted on computing environment 300, according to exemplary embodiments of the present disclosure.

As shown in FIG. 3C, client devices 302-1, 302-2, 302-3, and/or 302-N may be participating in a video conference session conducted by video conference service 325. The example implementation illustrated in FIG. 3C may be substantially similar to the example implementation illustrated in FIG. 3B, however, the publications of and subscriptions to the various data streams are different.

To initiate a video conference session between client devices 302-1, 302-2, 302-3, and/or 302-N, video conference service 325 may obtain a request to initiate a video conference session between client devices 302-1, 302-2, 302-3, and/or 302-N. For each of client devices 302-1, 302-2, 302-3, and/or 302-N, an associated edge node and/or server may be determined. This may include, for example, the edge node and/or server that is geographically closest to each of client devices 302-1, 302-2, 302-3, and/or 302-N. In the exemplary implementation illustrated in FIG. 3C, edge node and/or server 312-1 may be the edge node and/or server that was determined to be associated with client device 302-1, edge node and/or server 312-2 may be the edge node and/or server that was determined to be associated with client device 302-2, edge node and/or server 312-3 may be the edge node and/or server that was determined to be associated with client device 302-3, and edge node and/or server 312-N may be the edge node and/or server that was determined to be associated with client device 302-N. According to certain exemplary embodiments, the control plane may determine the edge nodes and/or servers for each client device 302.

Next, the publication and subscription status of each of client devices 302-1, 302-2, 302-3, and/or 302-N may be determined. For example, it may be determined which of client devices 302-1, 302-2, 302-3, and/or 302-N may be publishing a data stream, and which of client devices 302-1, 302-2, 302-3, and/or 302-N may be subscribing to one or more data streams published by one or more of client devices 302-1, 302-2, 302-3, and/or 302-N. In the exemplary implementation illustrated in FIG. 3C, client devices 302-1 and 302-2 are publishing data streams. Specifically, client device 302-1 is publishing STREAM A to edge node and/or server 312-1 and client device 302-2 is publishing STREAM B to edge node and/or server 312-2. Each of STREAM A and STREAM B may include a video stream captured by, for example, a microphone, camera/imaging device, etc. implemented on client devices 302-1 and 302-2, respectively. Accordingly, as client devices 302-3 and 302-N are not publishing their own data streams, they may be participating in the video conferencing session as observers and/or audience members. According to exemplary implementations, for each conference session, the control plane may maintain a directory including the location (e.g., location identifiers indicating the location of each edge node and/or server where each stream is published, etc.) of where each stream is published.

Further, as illustrated in FIG. 3C, each of client devices 302-1, 302-2, 302-3, and 302-N may be subscribed to any number of the streams published by the other client devices. For example, client device 302-1 may not be subscribed to any streams, client devices 302-2 and 302-3 may be subscribed to STREAM A published by client device 302-1, and client device 302-N may be subscribed to STREAMS A and B published by client devices 302-1 and 302-2, respectively. Accordingly, based on the subscriptions to the various streams by client devices 302-1, 302-2, 302-3, and 302-N, the appropriate streams may be transmitted and/or pushed, via a data network (e.g., a CDN, etc.), to the appropriate corresponding edge nodes and/or servers. As illustrated, in view of client devices 302-2 and 302-3's subscriptions to STREAM A, STREAM A, published by client device 302-1, may be pushed and/or transmitted to edge nodes and/or servers 312-2 and 312-3. Client devices 302-2 and 302-3 may then access and/or fetch STREAM A from edge nodes and/or servers 312-2 and 312-3, which may then be presented on client devices 302-2 and 302-3 as part of a video conference experience. Similarly, in view of client device 302-N's subscription to STREAMS A and B, STREAMS A and B, published by client devices 302-1 and 302-2, respectively, may be pushed and/or transmitted to edge node and/or server 312-N. Client device 302-N may then access and/or fetch STREAMS A and B from edge node and/or server 312-N, which may be presented on client device 302-N as a video conference experience. As client device 302-1 is not subscribed to any streams, client device 302-1 may be participating in the video conferencing session as a host, speaker, lecturer, presenter, and the like. Further, as client device 302-3 is only subscribed to STREAM A, client device 302-3 may only be interested in the stream captured and published by client device 302-1. The directory maintained by the control plane may also include locations (e.g., location identifiers indicating the location of each subscribing edge node and/or server, etc.) of the location where each stream is published Further, as exemplary implementations of the present disclosure can facilitate individually addressing each stream (e.g., STREAMS A and B associated with client devices 302-1 and 302-2) of a video conferencing session, video conference service 325 may facilitate features, such as selection of one or more streams associated with participants of a video conferencing session, initiation and/or termination with respect to one or more streams associated with participants of a video conferencing, and the like. For example, one or more of client devices 302 may subscribe to any number of STREAMS A and B, published by client devices 302-1 and 302-2, respectively, before or during the video conferencing session. Accordingly, any of client devices 302 may terminate its subscription to one or more of STREAMS A and B during the video conferencing session (e.g., via an instruction, command, indication, etc. sent to video conference service 325, etc.) without terminating participation from the video conferencing session. In such an exemplary implementation where client device 302-N were to terminate its subscription to STREAM B (published by client device 302-2), STREAM B may no longer be transmitted and/or pushed edge node and/or server 312-N, and STREAM B may no longer be available to and/or presented on client device 302-N as part of the video conference session experience. However, client device 302-N may continue to subscribe to STREAM A, which may continue to be presented on client device 302-N as part of the video conference session experience.

Similarly, one or more of client devices 302 may also terminate publishing a stream (e.g., via an instruction, command, indication, etc. sent to video conference service 325, etc.) at any time during or before the video conference session. For example, client device 302-2 may terminate publication of STREAM B during the video conference session. In such an exemplary implementation, STREAM B would no longer be published on edge node and/or server 312-2, and would therefore no longer be pushed and or transmitted to edge node and/or server 312-N and would no longer available to client device 302-N. However, the video conferencing session may continue with STREAM A continuing to be published by client device 302-1 to edge node and/or server 312-1 and transmitted and/or pushed to edge nodes and/or servers 312-3 and 312-N, which can continue to be accessed and fetched by client devices 302-3 and 302-N. Accordingly, the termination of publishing a stream and/or subscription to a stream may be updated in the directory maintained by the control plane.

Figure 3D:
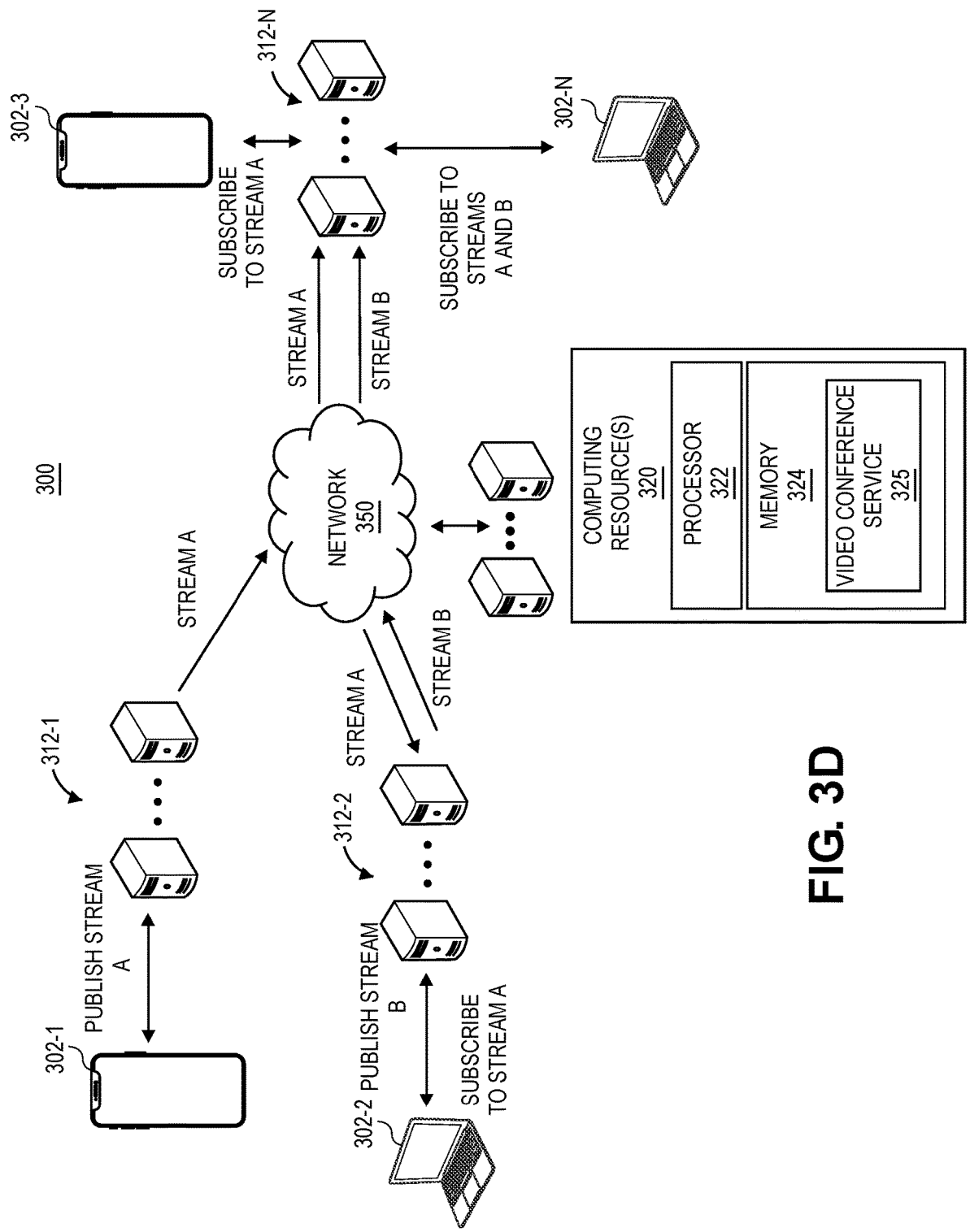

FIG. 3D illustrates yet another exemplary implementation of a video conference session conducted on computing environment 300, according to exemplary embodiments of the present disclosure.

As shown in FIG. 3D, client devices 302-1, 302-2, 302-3, and/or 302-N may be participating in a video conference session conducted by video conference service 325. The example implementation illustrated in FIG. 3D may be substantially similar to the example implementation illustrated in FIG. 3C, however, the association of edge nodes and/or servers to the client devices may be different.

To initiate a video conference session between client devices 302-1, 302-2, 302-3, and/or 302-N, video conference service 325 may obtain a request to initiate a video conference session between client devices 302-1, 302-2, 302-3, and/or 302-N. For each of client devices 302-1, 302-2, 302-3, and/or 302-N, an associated edge node and/or server may be determined. This may include, for example, the edge node and/or server that is geographically closest to each of client devices 302-1, 302-2, 302-3, and/or 302-N. In the exemplary implementation illustrated in FIG. 3D, edge node and/or server 312-1 may be the edge node and/or server that was determined to be associated with client device 302-1, edge node and/or server 312-2 may be the edge node and/or server that was determined to be associated with client device 302-2, and edge node and/or server 312-N may be the edge node and/or server that was determined to be associated with client devices 302-3 and 302-N. According to certain exemplary embodiments, the control plane may determine the edge nodes and/or servers for each client device 302.

Next, the publication and subscription status of each of client devices 302-1, 302-2, 302-3, and/or 302-N may be determined. For example, it may be determined which of client devices 302-1, 302-2, 302-3, and/or 302-N may be publishing a data stream, and which of client devices 302-1, 302-2, 302-3, and/or 302-N may be subscribing to one or more data streams published by one or more of client devices 302-1, 302-2, 302-3, and/or 302-N. In the exemplary implementation illustrated in FIG. 3D, client devices 302-1 and 302-2 are publishing data streams. Specifically, client device 302-1 is publishing STREAM A to edge node and/or server 312-1 and client device 302-2 is publishing STREAM B to edge node and/or server 312-2. Each of STREAM A and STREAM B may include a video stream captured by, for example, a microphone, camera/imaging device, etc. implemented on client devices 302-1 and 302-2, respectively. Accordingly, as client devices 302-3 and 302-N are not publishing their own data streams, they may be participating in the video conferencing session as observers and/or audience members. Further, according to exemplary implementations, for each conference session, the control plane may maintain a directory including the location (e.g., location identifiers indicating the location of each edge node and/or server where each stream is published, etc.) of where each stream is published.

As illustrated in FIG. 3D, each of client devices 302-1, 302-2, 302-3, and 302-N may be subscribed to any number of the streams published by the other client devices. For example, client device 302-1 may not be subscribed to any streams, client devices 302-2 and 302-3 may be subscribed to STREAM A published by client device 302-1, and client device 302-N may be subscribed to STREAMS A and B published by client devices 302-1 and 302-2, respectively. Accordingly, based on the subscriptions to the various streams by client devices 302-1, 302-2, 302-3, and 302-N, the appropriate streams may be transmitted and/or pushed, via a data network (e.g., a CDN, etc.), to the appropriate corresponding edge nodes and/or servers. As illustrated, in view of client devices 302-2 and 302-3's subscriptions to STREAM A, STREAM A, published by client device 302-1, may be pushed and/or transmitted to edge nodes and/or servers 312-2 and 312-N. Client devices 302-2 and 302-3 may then access and/or fetch STREAM A from edge nodes and/or servers 312-2 and 312-N, which may then be presented on client devices 302-2 and 302-3 as part of a video conference experience. Similarly, in view of client device 302-N's subscription to STREAMS A and B, STREAMS A and B, published by client devices 302-1 and 302-2, respectively, may be pushed and/or transmitted to edge node and/or server 312-N. Client device 302-N may then access and/or fetch STREAMS A and B from edge node and/or server 312-N, which may be presented on client device 302-N as a video conference experience. As client device 302-1 is not subscribed to any streams, client device 302-1 may be participating in the video conferencing session as a host, speaker, lecturer, presenter, and the like. Further, as client device 302-3 is only subscribed to STREAM A, client device 302-3 may only be interested in the stream captured and published by client device 302-1. The directory maintained by the control plane may also include locations (e.g., location identifiers indicating the location of each subscribing edge node and/or server, etc.) of the location where each stream is published.

In the exemplary implementation illustrated in FIG. 3D, client devices 302-3 and 302-N may be associated with the same edge node and/or server (i.e., edge node and/or server 312-N) and may both be subscribing to STREAM A, which is published by client device 302-1. Accordingly, STREAM A may be aggregated prior to being transmitted and/or pushed to edge node and/or server 312-N so that it is not necessary to transmit and/or push STREAM A to edge node and/or server 312-N multiple times in connection with the subscription to STREAM A by client devices 302-3 and 302-N.

Further, as exemplary implementations of the present disclosure can facilitate individually addressing each stream (e.g., STREAMS A and B associated with client devices 302-1 and 302-2) of a video conferencing session, video conference service 325 may facilitate features, such as selection of one or more streams associated with participants of a video conferencing session, initiation and/or termination with respect to one or more streams associated with participants of a video conferencing, and the like. For example, one or more of client devices 302 may subscribe to any number of STREAMS A and B, published by client devices 302-1 and 302-2, respectively, before or during the video conferencing session. Accordingly, any of client devices 302 may terminate its subscription to one or more of STREAMS A and B during the video conferencing session (e.g., via an instruction, command, indication, etc. sent to video conference service 325, etc.) without terminating participation from the video conferencing session. In such an exemplary implementation where client device 302-N were to terminate its subscription to STREAM B (published by client device 302-2), STREAM B may no longer be transmitted and/or pushed edge node and/or server 312-N, and STREAM B may no longer be available to and/or presented on client device 302-N as part of the video conference session experience. However, client device 302-N may continue to subscribe to STREAM A, which may continue to be presented on client device 302-N as part of the video conference session experience.

Similarly, one or more of client devices 302 may also terminate publishing a stream (e.g., via an instruction, command, indication, etc. sent to video conference service 325, etc.) at any time during or before the video conference session. For example, client device 302-2 may terminate publication of STREAM B during the video conference session. In such an exemplary implementation, STREAM B would no longer be published on edge node and/or server 312-2, and would therefore no longer be pushed and or transmitted to edge node and/or server 312-N and would no longer available to client device 302-N. However, the video conferencing session may continue with STREAM A continuing to be published by client device 302-1 to edge node and/or server 312-1 and transmitted and/or pushed to edge nodes and/or servers 312-2 and 312-N, which can continue to be accessed and fetched by client devices 302-2, 302-3 and 302-N. Accordingly, the termination of publishing a stream and/or subscription to a stream may be updated in the directory maintained by the control plane.

Figure 4:
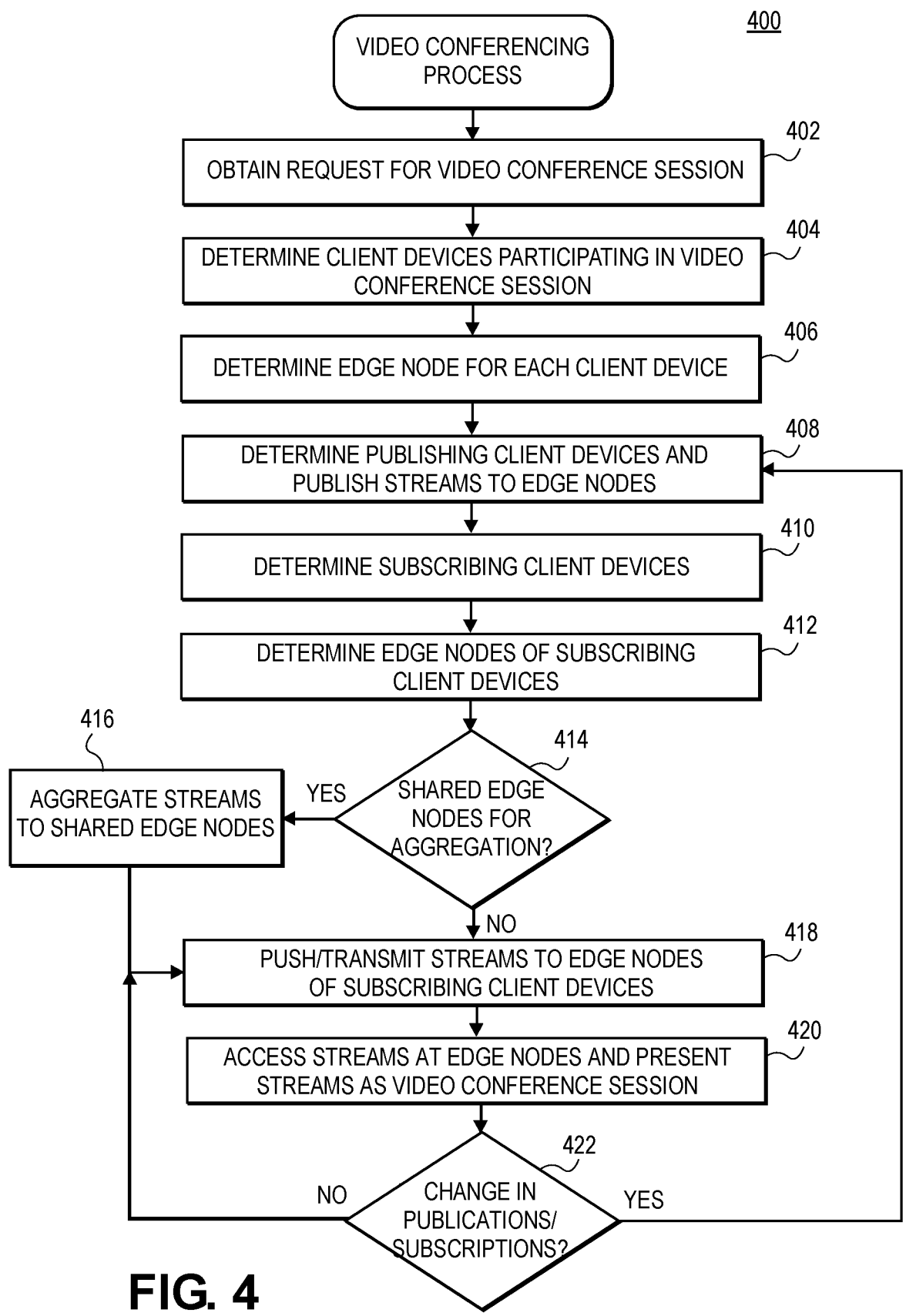
FIG. 4 is a flow diagram of an exemplary video conferencing process, according to exemplary embodiments of the present disclosure.

FIG. 4 is a flow diagram of an exemplary video conferencing process 400, according to exemplary embodiments of the present disclosure.

As shown in FIG. 4, exemplary video conferencing process 400 may begin with obtaining of a request for a video conference session, as in step 402. This can be received from one or more client devices requesting to participate in a video conference session. In step 404, the client devices participating in the video conference session may be determined, and an edge node and/or server for each client device may be determined and associated with each client device, as in step 406. For example, edge nodes and/or servers may be determined (e.g., by the control plane) based on geographical location (e.g., geographically closest to each respective client device, etc.), the current operating state of each edge node and/or server within a certain geographic area (e.g., threshold distance and/or area, etc.) surrounding each respective client device may be determined and the edge node and/or server able to provide the relatively fastest performance may be selected as the edge node and/or server for each respective client device, and the like.

After edge nodes have been determined for each client device, the publishing clients may be determined and the streams associated with each publishing client device may be published to each corresponding edge node and/or server, as in step 408. For example, the streams that are to be published may be captured by the respective client device (e.g., using a microphone, imaging device, etc.) and may be published to the cache of the edge node and/or server. In step 410, the subscribing client devices may be determined. This may include, for example, determining the published streams to which the client devices are subscribing. According to certain exemplary implementations, the location (e.g., location identifiers indicating the location of each edge node and/or server where each stream is published and each subscribing edge node and/or server, etc.) of the published streams and the subscriptions may be maintained in a directory (e.g., by the control plane).

In step 412, the edge nodes and/or servers associated with the subscribing client devices may be determined. For example, the edge nodes and/or servers may have been determined for the subscribing client devices in step 406 of process 400. In step 414, it may optionally be determined whether any shared edge nodes and/or servers exist for aggregation of published streams. For example, it may be determined whether any subscribing client devices are associated with a common edge node and/or server and are subscribed to a common stream. In the event that two or more client devices subscribing to a common stream are associated with the same edge node and/or server, the streams may be aggregated, as in step 416, so as to avoid sending the same stream multiple times to the same edge node and/or server.

In step 418, the streams are pushed and/or transmitted to the edge nodes and/or servers associated with the subscribing client devices. For example, the streams may be pushed and/or transmitted using a low-latency, private CDN. In step 420, the streams may be accessed and/or fetched from the edge nodes and/or servers associated with the subscribing client devices, and the accessed streams may be presented on the client devices as part of a video conferencing session experience.

Optionally, in step 422, it can be determined if there are any changes to the publication and/or subscription of streams. For example, in view of the individual addressability of each stream, one or more of the client devices participating in the video conferencing session may choose to begin or cease publishing a stream, initiate or terminate a subscription to a stream, and the like. If there is a change in the publications and/or subscriptions to any of the streams, process 400 may return to step 408 so that the publishing client devices may be determined. In the event that there are only changes to subscriptions, process 400 may return to step 410 instead. If there are no changes to the publications and/or subscriptions to the streams, process 400 may return to step 418 so that the published streams are continued to be pushed and/or transmitted to the edge nodes and/or servers of the subscribing client devices under the video conferencing session ends.

Figure 5A:
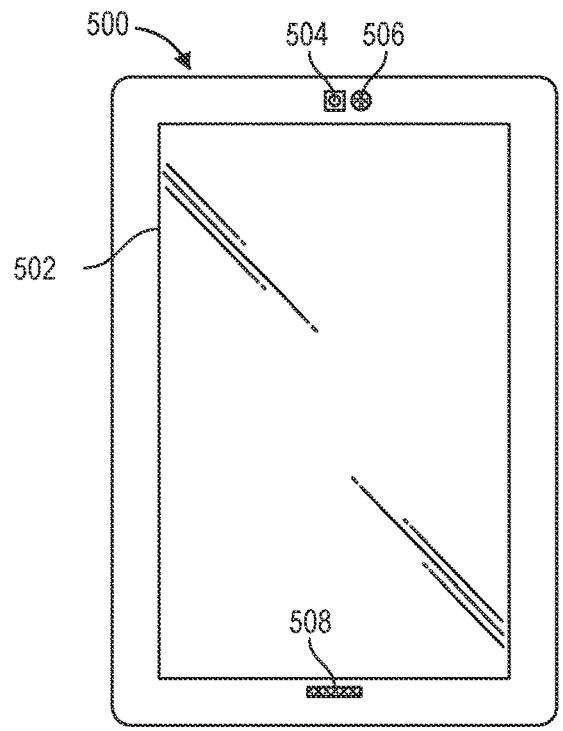
FIGS. 5A and 5B are illustrations of an exemplary client device, according to exemplary embodiments of the present disclosure.
Figure 5B:
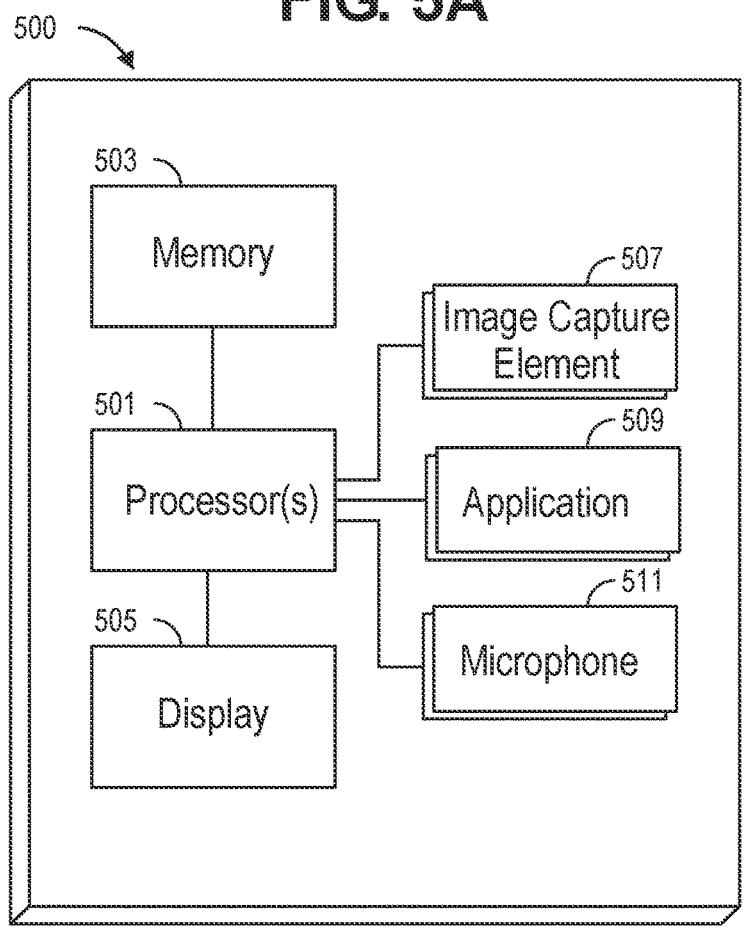

FIGS. 5A and 5B illustrate an exemplary client device 500 that can be used in accordance with various implementations described herein. In this example, client device 500 includes display 502 and optionally, at least one input component 504, such as a camera, on a same side and/or opposite side of the device as display 502. Client device 500 may also include an audio transducer, such as speaker 506, and microphone 508. Generally, client device 500 may have any form of input/output components that allow a user to interact with client device 500. For example, the various input components for enabling user interaction with the device may include touch-based display 502 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a user device or otherwise in communication with the user device. Various other input components and combinations of input components can be used as well within the scope of the various implementations, as should be apparent in light of the teachings and suggestions contained herein.

In order to provide the various functionality described herein, FIG. 5B illustrates, as a block diagram, an exemplary set of components of client device 500. In this example, client device 500 includes at least one central processor 501 for executing instructions that can be stored in at least one memory device or element 503. As would be apparent to one of ordinary skill in the art, the device can include many types of memory, data storage or computer-readable storage media, such as a first data storage for program instruction for execution by the one or more processors 501. Removable storage memory can be available for sharing information with other devices, etc. The device typically will include some type of display 505, such as a touch-based display, electronic ink (e-ink), organic light emitting diode (OLED), liquid crystal display (LCD), etc.

As discussed, the device in many implementations will include at least one image capture element 507, such as one or more cameras that are able to capture an image of objects in the vicinity of the device. An image capture element can include, or be based at least in part upon, any appropriate technology, such as a CCD or CMOS image capture element having a determined resolution, focal range, viewable area, and capture rate. The device can include at least one application component 509 for performing the implementations discussed herein, such as participating in a conferencing session. The user device may be in constant or intermittent communication with one or more remote computing resources and may exchange information, such as livestream feeds, chat messages, etc., with the remote computing system(s) as part of the disclosed implementations.

The device also can include at least one location component, such as GPS, NFC location tracking, Wi-Fi location monitoring, etc. Location information obtained by the location component may be used with the various implementations discussed herein as a factor in, for example, determining location of a participant and/or host of a live, interactive, livestream session and from a livestream feed generated by image capture element 507 and microphone 511 of the client device while hosting and/or participating in a live, interactive, livestream session.

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can submit an input to the device. These I/O devices could be connected by a wireless, infrared, Bluetooth, or other link as well in some implementations. In some implementations, however, such a device might not include any buttons at all and might be controlled only through touch inputs (e.g., touch-based display), audio inputs (e.g., spoken), or a combination thereof.

Figure 6:
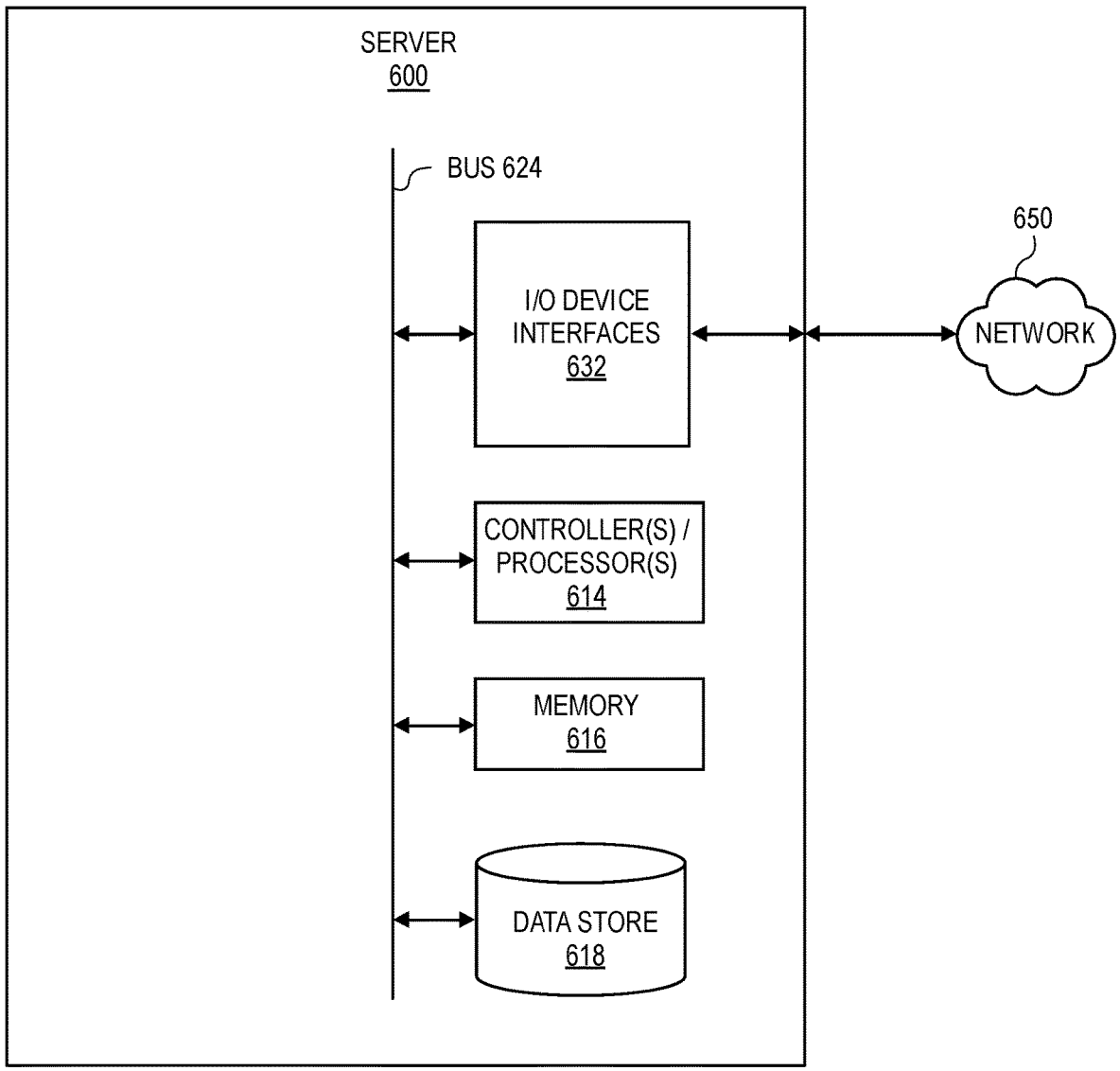
FIG. 6 is a block diagram of an exemplary server, according to exemplary embodiments of the present disclosure.

FIG. 6 is a block diagram conceptually illustrating example components of a server and/or remote computing device (e.g., computing resources 120 and 320, edge nodes and/or servers 312, etc.), such as remote server 600 on which exemplary embodiments of the present disclosure may be executed. Multiple such servers 600 may be included in the system.

Each of server(s) 600 may include one or more controllers/processors 614, that may each include a central processing unit (CPU) for processing data and computer-readable instructions, and memory 616 for storing data and instructions. Memory 616 may individually include volatile random-access memory (RAM), non-volatile read only memory (ROM), non-volatile magnetoresistive (MRAM) and/or other types of memory. Each server may also include a data storage component 618, for storing data, controller/processor-executable instructions, training data, labels, network telemetry information, etc. Each data storage component 618 may individually include one or more non-volatile storage types, such as magnetic storage, optical storage, solid-state storage, etc. Each server 600 may also be connected to removable or external non-volatile memory and/or storage (such as a removable memory card, memory key drive, networked storage, etc.), internal, and/or external networks 650 (e.g., the Internet) through respective input/output device interfaces 632.

Computer instructions for operating each server 600 and its various components may be executed by the respective server's controller(s)/processor(s) 614, using memory 616 as temporary "working" storage at runtime. Server 600's computer instructions may be stored in a non-transitory manner in non-volatile memory 616, storage data 618, and/or an external device(s). Alternatively, some or all of the executable instructions may be embedded in hardware or firmware on the respective device in addition to or instead of software.

Each server 600 includes input/output device interfaces 632. A variety of components may be connected through the input/output device interfaces. Additionally, each server 600 may include address/data bus 624 for conveying data among components of the respective server. Each component within server 600 may also be directly connected to other components in addition to (or instead of) being connected to other components across bus 624.

The components of the server(s) 600, as illustrated in FIG. 6, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIG. 4, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    publishing a first stream received from a first client device to a first edge server;
    publishing a second stream received from a second client device to a second edge server;
    based at least in part on a first determination that the first client device is subscribed to the second stream and the second client device is subscribed to the first stream:
        transmitting, via a data network, the first stream to the second edge server;
        transmitting, via the data network, the second stream to the first edge server;
        causing the second stream to be accessible by the first client device at the first edge server;
        causing the first stream to be accessible by the second client device at the second edge server; and
        establishing a conferencing session between the first client device and the second client device by causing the first stream to be presented on the second client device and causing the second stream to be presented on the first client device.

2. The computer-implemented method of claim 1, further comprising:
    publishing a third stream received from a third client device to a third edge server;
    based at least in part on a second determination that the first client device is subscribed to the third stream:
        transmitting, via the data network, the third stream to the first edge server;
        causing the third stream to be accessible by the first client device at the first edge server; and
        maintaining the conferencing session between the first client device, the second client device, and the third client device by further causing the third stream to be presented on the first client device.

3. The computer-implemented method of claim 2, further comprising:
    based at least in part on a third determination that the third client device is subscribed to the first stream and the second stream:
        transmitting, via the data network, the first stream and the second stream to the third edge server;
        causing the first stream and the second stream to be accessible by the third client device at the third edge server; and
        conducting the conferencing session between the first client device, the second client device, and the third client device by further causing the first stream and the second stream to be presented on the third client device.

4. The computer-implemented method of claim 3, further comprising:
    receiving, from the first client device, an indication that it is terminating its subscription to the second stream;

causing the second stream to be no longer presented on the first client device; and maintaining the conferencing session between the first client device, the second client device, and the third client device by causing:

the third stream to be presented on the first client device;

the first stream to be presented on the second client device; and the first stream and the second stream to be presented on the third client device.

5. The computer-implemented method of claim 3, further comprising:

receiving, from the first client device, an indication that it is terminating publication of the first stream;

discontinuing publishing of the first stream at the first edge server, so that the first stream is no longer accessible to the second client device and the third client device; and maintaining the conferencing session between the first client device, the second client device, and the third client device by causing:

the third stream to be presented on the first client device; and the second stream to be presented on the third client device.

6. The computer-implemented method of claim 1, wherein the conferencing session includes at least one of:

a video conferencing session;
a live streaming gaming session;
a video on demand session; or
a media broadcast session.

7. A computing system, comprising:

one or more processors; and a memory storing program instructions that, when executed by the one or more processors, cause the one or more processors to at least:

determine a plurality of participant client devices for participating in a conferencing session, wherein the plurality of participant client devices includes a plurality of publishing client devices and a plurality of subscribing client devices;

publish a plurality of data streams received from the plurality of publishing client devices to a first plurality of edge servers associated with the plurality of publishing client devices;

determine a plurality of subscriptions between the plurality of publishing client devices and the plurality of subscribing client devices;

cause, based at least in part on the plurality of subscriptions, the plurality of data streams to be sent, via a data network, from the first plurality of edge servers to a second plurality of edge servers that are associated with the plurality of subscribing client devices, such that the plurality of data streams are accessible to the plurality of subscribing client devices; and cause the plurality of data streams to be presented on the plurality of subscribing client devices so as to initiate the conferencing session with the plurality of participant client devices.

8. The computing system of claim 7, wherein the program instructions that, when executed by the one or more processors, further cause the one or more processors to at least:

determine that a first client device from the plurality of subscribing client devices is associated with a first edge server from the second plurality of edge servers;

determine that a second client device from the plurality of subscribing client devices is associated with the first edge server;

determine, based at least in part on the plurality of subscriptions, that the first client device is subscribed to a first data stream from the plurality of data streams;

determine, based at least in part on the plurality of subscriptions, that the second client device is subscribed to the first data stream from the plurality of data streams;

aggregate the first data stream for the first client device and the second client device; and cause the aggregated first data stream to be sent, via the data network, to the first edge computing resource, so that it is accessible by the first client device and the second client device.

9. The computing system of claim 7, wherein the program instructions that, when executed by the one or more processors, further cause the one or more processors to at least:

receive, from a first client device of the plurality of subscribing client devices, an indication that it is terminating its subscription to a first data stream of the plurality of data streams;

cause the first data stream to be discontinued from being presented on the first client device; and maintain the conferencing session between the plurality of participant client devices, such that the conferencing session includes the first client device and the first data stream is not presented on the first client device.

10. The computing system of claim 7, wherein the program instructions that, when executed by the one or more processors, further cause the one or more processors to at least:

receive, from a first client device of the plurality of subscribing client devices, an indication that it is terminating publication of a first data stream of the plurality of data streams; and terminate publication of the first data stream at a first edge server of the first plurality of edge servers, so that the first data stream is no longer sent to the second plurality of edge servers and is not accessible to the plurality of subscribing client devices.

11. The computing system of claim 7, wherein the program instructions that, when executed by the one or more processors, further cause the one or more processors to at least:

receive, from a first client device of the plurality of subscribing client devices, an indication that it is initiating a subscription to a first data stream of the plurality of data streams;

cause the first data stream to be sent, via the data network, to a first edge server of the second plurality of edge servers that is associated with the first client device, so that the first data stream is accessible by the first client device; and maintain the conferencing session between the plurality of participant client devices, such that the conferencing session includes the first client device and the first data stream is presented on the first client device.

12. The computing system of claim 7, wherein the program instructions that, when executed by the one or more processors, further cause the one or more processors to at least:

determine at least one of the first plurality of edge servers and the second plurality of edge servers based at least in part on first geographic locations of the first plurality of edge servers, second geographic locations of the second plurality of edge servers, and third geographic locations of the plurality of participant client devices.

13. The computing system of claim 7, wherein the plurality of data streams are individually addressable.

14. The computing system of claim 7, wherein at least one of:
   a first number of the plurality of publishing client devices is less than a second number of the plurality of participant client devices; or
   a third number of the plurality of subscribing client devices is less than the second number of the plurality of participant client devices.

15. The computing system of claim 7, wherein the data network includes a low-latency, content delivery network (CDN).

16. A method, comprising:
   receiving a plurality of data streams from a first plurality of client devices;
   publishing the plurality of data streams to a first plurality of edge servers associated with the first plurality of client devices;
   identifying a second plurality of client devices that are subscribed to the plurality of data streams;
   transmitting, via a data network, the plurality of data streams to a second plurality of edge servers associated with the second plurality of client devices, so that the plurality of data streams are accessible by the second plurality of client devices at the second plurality of edge servers; and
   causing the plurality of data streams to be presented on the second plurality of client devices, so as to conduct a conference between the first plurality of client devices and the second plurality of client devices.

17. The method of claim 16, further comprising:
   determining the first plurality of edge servers based at least in part on first geographic locations associated with the first plurality of client devices; and
   determining the second plurality of edge servers based at least in part on second geographic locations associated with the second plurality of client devices.

18. The method of claim 16, wherein the plurality of data streams include content captured by the first plurality of client devices.

19. The method of claim 16, wherein the plurality of data streams are individually addressable.

20. The method of claim 16, wherein:
   at least one first client device of the second plurality of client devices is not publishing a first data stream; and
   at least one second client device of the first plurality of client devices is not subscribed to at least one second data stream of the plurality of data streams.

* * * * *